US00RE45022E

(19) United States
(12) Reissued Patent
Graham et al.

(10) Patent Number: US RE45,022 E
(45) Date of Reissued Patent: Jul. 22, 2014

(54) BOTTLE

(75) Inventors: Heidi N. Graham, Cordova, TN (US); Kimberly Lyn McCormack, Maplewood, NJ (US); Laura Ann Flanagan-Kent, Decatur, GA (US)

(73) Assignee: MSD Consumer Care, Inc., Memphis, TN (US)

(21) Appl. No.: 29/415,275

(22) Filed: Mar. 8, 2012

Related U.S. Patent Documents

Reissue of:
(64) Patent No.: Des. 619,898
Issued: Jul. 20, 2010
Appl. No.: 29/306,928
Filed: Apr. 18, 2008

(51) LOC (10) Cl. ..... 09-01
(52) U.S. Cl.
USPC ..... D9/540; D9/563; D9/566; D9/564; D9/575
(58) Field of Classification Search
USPC ..... D9/516, 540, 542, 543, 550, 551, 558, D9/563, 564, 565, 566, 571, 572, 573, 574, D9/575; 220/660, 669
See application file for complete search history.

(56) References Cited

U.S. PATENT DOCUMENTS

D97,512 S 11/1935 Smith
D156,219 S 11/1949 Deskey (Continued)

OTHER PUBLICATIONS

U.S. Trademark Application No. 77/775265 Prosecution History: Notice of Abandonment.

(Continued)

*Primary Examiner* — Phillip S Hyder
(74) *Attorney, Agent, or Firm* — Kenyon & Kenyon LLP

(57) CLAIM

The ornamental design for a bottle, as shown and described.

DESCRIPTION

FIG. 1 is a perspective view of a bottle showing our new design;
FIG. 2 is a front view thereof;
FIG. 3 is a right side view thereof;
FIG. 4 is a left side view thereof;
FIG. 5 is a back view thereof.;
FIG. 6 is a top view thereof;
FIG. 7 is a bottom view thereof;
FIG. 8 is a perspective view of a *second embodiment of the* bottle showing our new design;
FIG. 9 is a front view thereof;
FIG. 10 is a right side view thereof;
FIG. 11 is a left side view thereof;
FIG. 12 is a back view thereof.;
FIG. 13 is a top view thereof;
FIG. 14 is a bottom view thereof;
FIG. 15 is a perspective view of a *third embodiment of the* bottle showing our new design;
FIG. 16 is a front view thereof;
FIG. 17 is a right side view thereof;
FIG. 18 is a left side view thereof;
FIG. 19 is a back view thereof;
FIG. 20 is a top view thereof; and,
FIG. 21 is a bottom view thereof.

[The broken line showing of a portion of the bottom is included for the purpose of illustrating environmental structure and forms no part of the claimed design.]

*The broken lines depict portions of the bottle in which the design is embodied that are not considered part of the claimed design.*

1 Claim, 12 Drawing Sheets

Figure 4:
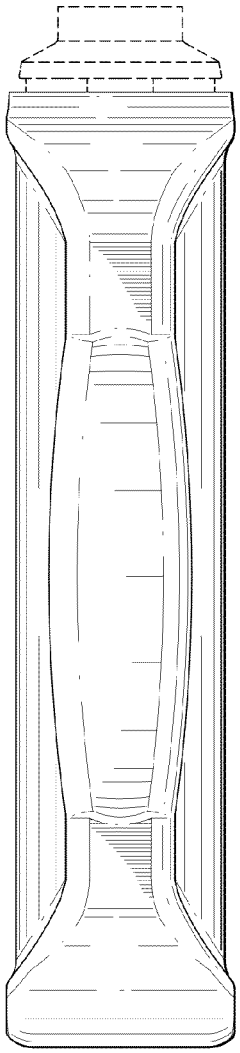
Figure 6:
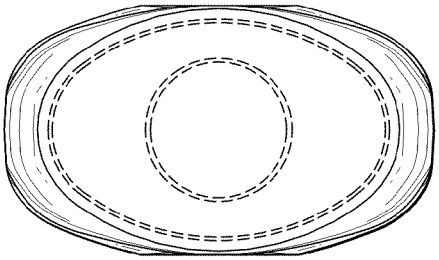
Figure 11:
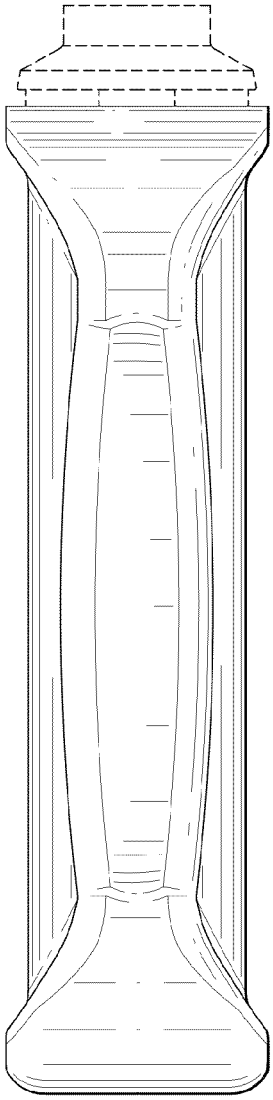
Figure 13:
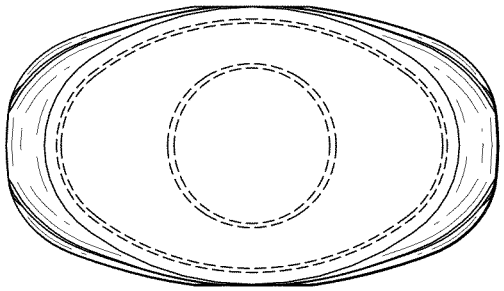
Figure 18:
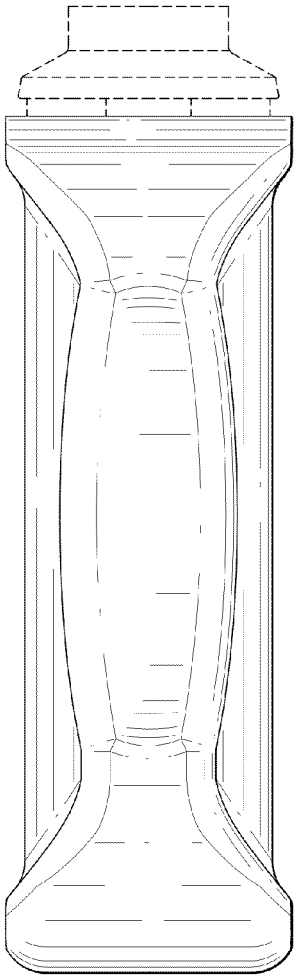
Figure 20:
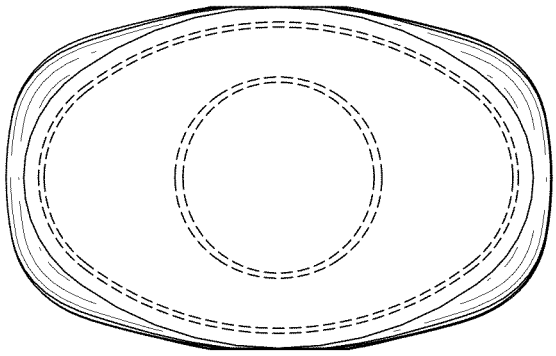

Matter enclosed in heavy brackets [ ] appears in the original patent but forms no part of this reissue; matter printed in italics indicates the additions made by reissue.

Amended

(56) References Cited

U.S. PATENT DOCUMENTS

| | | | | |
|---|---|---|---|---|
| D221,133 | S | | 7/1971 | Wikke |
| D234,492 | S | | 3/1975 | Peterson |
| D234,911 | S | | 4/1975 | Stevens, Jr. |
| D235,245 | S | | 6/1975 | McDonald |
| D237,463 | S | | 11/1975 | Kretz |
| D242,225 | S | | 11/1976 | Sinclair |
| D249,228 | S | | 9/1978 | Schacher et al. |
| D263,804 | S | | 4/1982 | Kondo et al. |
| D274,309 | S | | 6/1984 | Aldrich, III |
| D303,100 | S | | 8/1989 | Segati |
| 4,885,809 | A | | 12/1989 | Muchmore |
| D309,714 | S | | 8/1990 | Blesecker |
| D334,538 | S | | 4/1993 | Bolen, Jr. et al. |
| D335,456 | S | | 5/1993 | Brown |
| D343,360 | S | | 1/1994 | Poo |
| D346,744 | S | | 5/1994 | Ford et al. |
| D346,963 | S | | 5/1994 | Crawford |
| D355,369 | S | | 2/1995 | Lund et al. |
| 5,417,991 | A | | 5/1995 | Green |
| D367,010 | S | | 2/1996 | Moore et al. |
| D367,011 | S | | 2/1996 | Lilly et al. |
| D372,199 | S | | 7/1996 | Lathrop et al. |
| D372,873 | S | | 8/1996 | Lathrop et al. |
| D376,320 | S | | 12/1996 | Lathrop et al. |
| D376,697 | S | | 12/1996 | Green et al. |
| D376,980 | S | | 12/1996 | LoPreto |
| D384,285 | S | | 9/1997 | D'Amico et al. |
| D394,812 | S | | 6/1998 | Crawford |
| D398,479 | S | | 9/1998 | Vultaggio et al. |
| D405,373 | S | | 2/1999 | Crawford |
| D408,740 | S | | 4/1999 | Jones et al. |
| D414,118 | S | | 9/1999 | Crawford |
| D415,688 | S | | 10/1999 | Crawford |
| D416,805 | S | | 11/1999 | Mikla |
| D422,220 | S | | 4/2000 | Feen |
| D425,429 | S | | 5/2000 | Weber |
| D425,795 | S | | 5/2000 | Feen |
| D425,797 | S | | 5/2000 | Crawford |
| D427,914 | S | | 7/2000 | Croft et al. |
| D429,648 | S | | 8/2000 | Goettner |
| D443,825 | S | | 6/2001 | Goettner |
| D447,058 | S | | 8/2001 | Weber |
| D457,069 | S | | 5/2002 | Palaia |
| D459,659 | S | | 7/2002 | Chung |
| D469,698 | S | | 2/2003 | Zaksenberg et al. |
| D471,462 | S | | 3/2003 | May et al. |
| D472,153 | S | | 3/2003 | Feen |
| D486,741 | S | | 2/2004 | Houghton |
| D486,742 | S | | 2/2004 | Houghton |
| D489,994 | S | | 5/2004 | Crawford |
| D491,067 | S | | 6/2004 | Crawford |
| D491,815 | S | | 6/2004 | Crawford |
| D492,202 | S | | 6/2004 | Crawford |
| D495,605 | S | | 9/2004 | Crawford |
| D495,609 | S | | 9/2004 | Wurster |
| D496,283 | S | | 9/2004 | Busa, Jr. |
| D498,680 | S | | 11/2004 | Cleary |
| D505,079 | S | | 5/2005 | Mulder et al. |
| D511,969 | S | | 11/2005 | Busa et al. |
| D514,448 | S | | 2/2006 | Kuzma et al. |
| D522,372 | S | | 6/2006 | Wang et al. |
| D528,006 | S | | 9/2006 | Walther et al. |
| D528,007 | S | | 9/2006 | De Niverville et al. |
| D529,810 | S | | 10/2006 | Davies et al. |
| D529,812 | S | | 10/2006 | Ratzlaff |
| D529,814 | S | | 10/2006 | Winkler et al. |
| D532,312 | S | | 11/2006 | Conway et al. |
| D533,069 | S | * | 12/2006 | Archeny ..... D9/542 |
| D533,073 | S | | 12/2006 | Brunner et al. |
| D535,565 | S | | 1/2007 | Pitassi |
| D545,210 | S | | 6/2007 | Armstrong et al. |
| D545,211 | S | | 6/2007 | Armstrong et al. |
| D546,187 | S | | 7/2007 | Ratzlaff |
| D546,189 | S | | 7/2007 | Costello et al. |
| D548,602 | S | | 8/2007 | Escobosa et al. |
| D552,995 | S | | 10/2007 | Toh |
| D553,502 | S | | 10/2007 | Toh |
| D567,096 | S | | 4/2008 | Toh |
| D585,752 | S | * | 2/2009 | Shami ..... D9/530 |
| D590,717 | S | | 4/2009 | Weber |

OTHER PUBLICATIONS

U.S. Trademark Application No. 77/775265 Prosecution History: Office Action dated Aug. 4, 2010.
U.S. Trademark Application No. 77/775265 Prosecution History: Banana Boat Sport Performance Sunscreen.
U.S. Trademark Application No. 77/775265 Prosecution History: Hawaiian Tropic Sheer Touch Lotion Sunscreen.
U.S. Trademark Application No. 77/775265 Prosecution History: Silgan Plastics HDPE Tapered & Wave-Side Oblongs.
U.S. Trademark Application No. 77/775265 Prosecution History: Silgan Plastics Bottle & Jar Catalog.
U.S. Trademark Application No. 77/775265 Prosecution History: Bottle Image.
U.S. Trademark Application No. 77/775265 Prosecution History: Amendment and Mail Process dated Aug. 3, 2010.
U.S. Trademark Application No. 77/775265 Prosecution History: Amended Drawing dated Aug. 1, 2010.
U.S. Trademark Application No. 77/775265 Prosecution History: Drawing dated Aug. 1, 2010.
U.S. Trademark Application No. 77/775265 Prosecution History: Response to Office Action dated Aug. 1, 2010.
U.S. Trademark Application No. 77/775265 Prosecution History: Office Action dated Feb. 3, 2010.
U.S. Trademark Application No. 77/775265 Prosecution History: cpc packaging Applications: The New Face of Coppertone.
U.S. Trademark Application No. 77/775265 Prosecution History: Seaquist Closures 19.5mm Large Gem Oval Snap Top.
U.S. Trademark Application No. 77/775265 Prosecution History: Seaquist Closures Large Gemini Snap Top.
U.S. Trademark Application No. 77/775265 Prosecution History: Safeway Sunscreen Lotion.
U.S. Trademark Application No. 77/775265 Prosecution History: U.S. Patent No. 6,321,923.
U.S. Trademark Application No. 77/775265 Prosecution History: Amendment and Mail process dated Jan. 22, 2010.
U.S. Trademark Application No. 77/775265 Prosecution History: Amended Drawing dated Jan. 21, 2010.
U.S. Trademark Application No. 77/775265 Prosecution History: Drawing dated Jan. 21, 2010.
U.S. Trademark Application No. 77/775265 Prosecution History: Response to Office Action dated Jan. 21, 2010.
U.S. Trademark Application No. 77/775265 Prosecution History: Revocation of Attorney/Domestic Representative and/or Appointment of Attorney/Domestic Representative.
U.S. Trademark Application No. 77/775265 Prosecution History: Office Action dated Jul. 21, 2009.
U.S. Trademark Application No. 77/775265 Prosecution History: Bonanzle Moisture Therapy Cucumber Body Lotion.
U.S. Trademark Application No. 77/775265 Prosecution History: beauty encounter Vaseline Intensive Care Healthy Body Complexion Nourishing Body Lotion.
U.S. Trademark Application No. 77/775265 Prosecution History: Smallflower Kneipp Evening Primrose Body Lotion.
U.S. Trademark Application No. 77/775265 Prosecution History: Smallflower Weleda Calendula Baby Body Lotion.
U.S. Trademark Application No. 77/775265 Prosecution History: Dove Supreme Clean Oil Sleek Satin Body Wash.
U.S. Trademark Application No. 77/775265 Prosecution History: Dove Energy Glow Beauty Body Lotion.
U.S. Trademark Application No. 77/775265 Prosecution History: Banana Boat Sport Performance DriBlok Sunscreen.
U.S. Trademark Application No. 77/775265 Prosecution History: drugstore.com AXE Snake Peel Shower Scrub with Desert Minerals + Cactus Oil.
U.S. Trademark Application No. 77/775265 Prosecution History: O.Berk Company Plastic Bottles—Grip-Handle Liquid Container.

(56) References Cited

OTHER PUBLICATIONS

U.S. Trademark Application No. 77/775265 Prosecution History: drugstore.com Irish Spring Body Wash.
U.S. Trademark Application No. 77/775265 Prosecution History: Avon Moisture Therapy Intensive Body Lotion.
U.S. Trademark Application No. 77/775265 Prosecution History: Dial Body Wash.
U.S. Trademark Application No. 77/775265 Prosecution History: Gillette Hydrator + Body Wash.
U.S. Trademark Application No. 77/775265 Prosecution History: Olay Age Defying Body Wash.
U.S. Trademark Application No. 77/775265 Prosecution History: Suncare Glossary.
U.S. Trademark Application No. 77/775265 Prosecution History: viewpoints Non-Greasy Sunscreen Reviews.
U.S. Trademark Application No. 77/775265 Prosecution History: Paula's Choice Essential Non-Greasy Sunscreen.
U.S. Trademark Application No. 77/775265 Prosecution History: SkinAct Epicuren Discovery Organic Cleen 4 Teen—Non-greasy Sunscreen.
U.S. Trademark Application No. 77/775265 Prosecution History: kaboodle DHC White Sunscreen, Non-Greasy.
U.S. Trademark Application No. 77/775265 Prosecution History: Associated Content Sunscreen for Acne-Prone Skin: Non-Greasy, Oil-Free Products.
U.S. Trademark Application No. 77/775265 Prosecution History: Skin911.com Celazome Moisturizing Sunscreen.
U.S. Trademark Application No. 77/775265 Prosecution History: Nordstrom Kiehl's UV Protective Everyday Facial Moisturizing Sunscreen Cream.
U.S. Trademark Application No. 77/775265 Prosecution History: DermatologistRx Celazome Moisturizing Sunscreen.
U.S. Trademark Application No. 77/775265 Prosecution History: California Baby No Fragrance SPF 18 Moisturizing Sunscreen Lotion.
U.S. Trademark Application No. 77/775265 Prosecution History: Dr. Susan Taylor's Protect and Defend Moisturizing Sunscreen.
U.S. Trademark Application No. 77/775265 Prosecution History: XSearch Search Summary dated Jul. 15, 2009.
U.S. Trademark Application No. 77/775265 Prosecution History: XSearch Search Summary dated Jul. 14, 2009.
U.S. Trademark Application No. 77/775265 Prosecution History: Notice of Design Search Code and Pseudo Mark for U.S. Appl. No. 77/775,265.
U.S. Trademark Application No. 77/775265 Prosecution History: Drawing dated Jul. 7, 2009.
U.S. Trademark Application No. 77/775265 Prosecution History: Trademark/Service Mark Application, Principal Register dated Jul. 7, 2009.

* cited by examiner

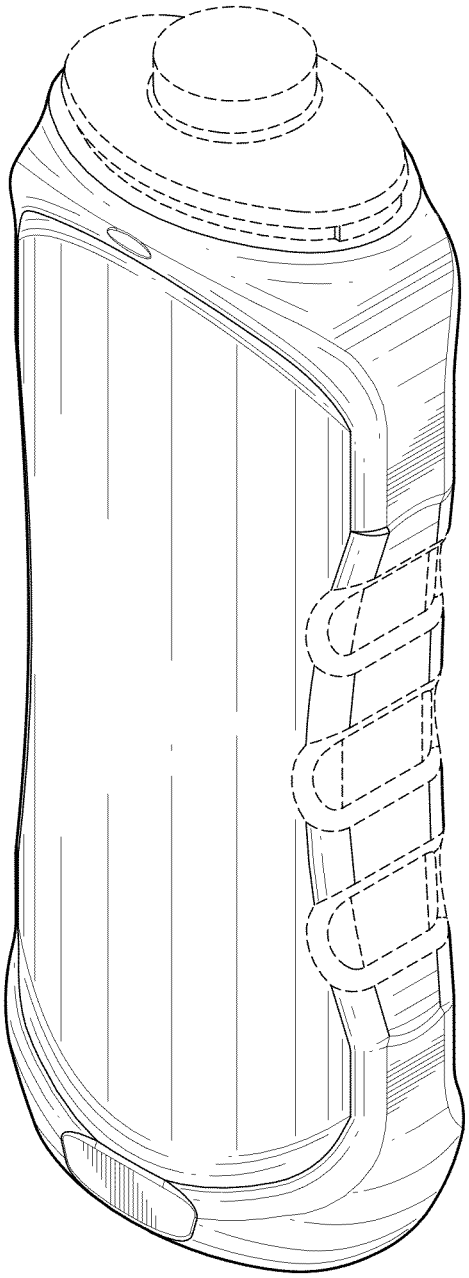
FIG. 1
Amended

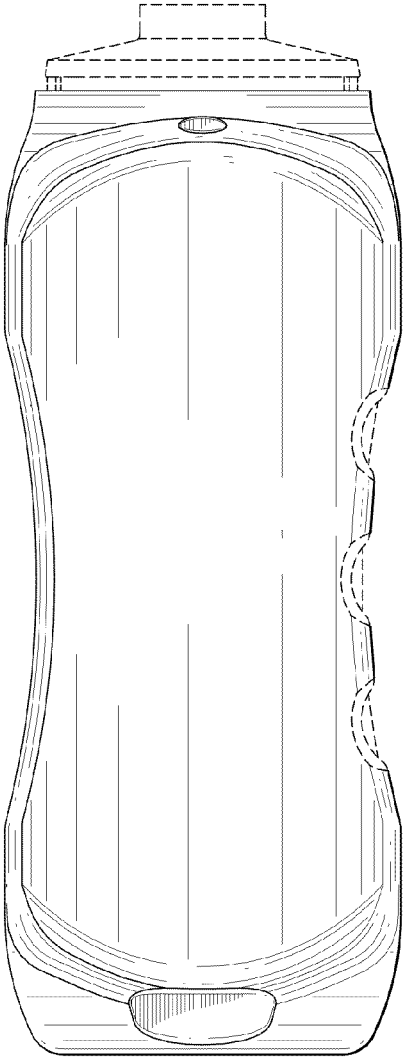
FIG. 2
Amended
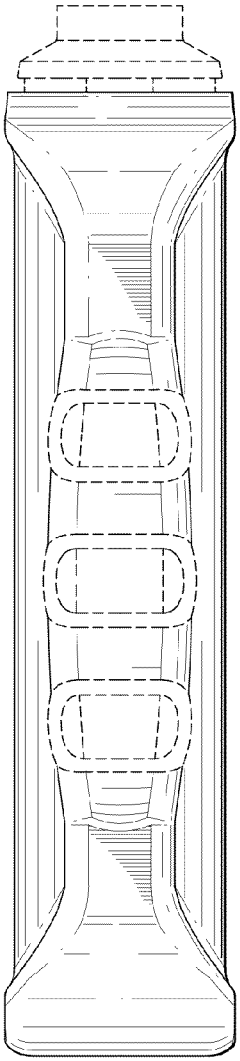
FIG. 3
Amended

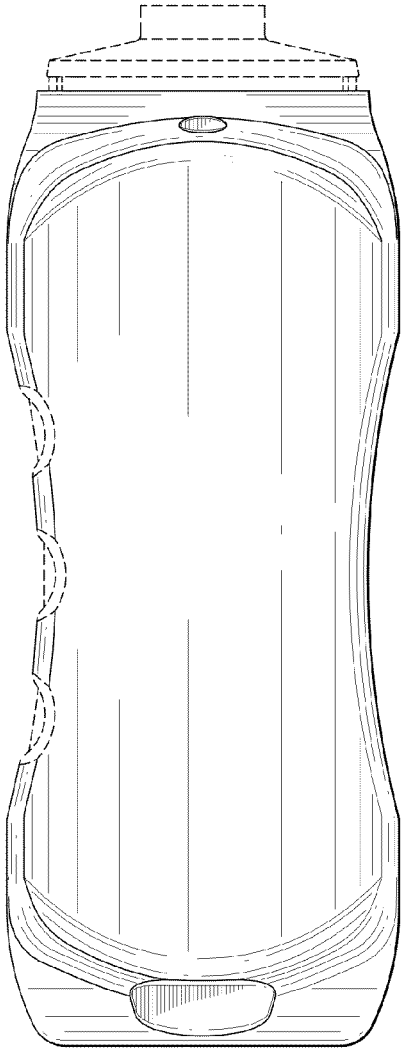
FIG.5
Amended

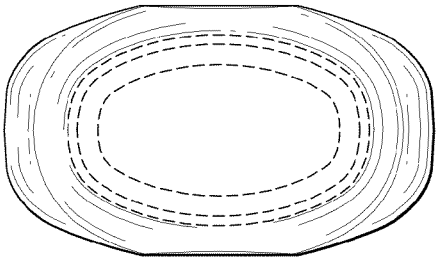
FIG.7
Amended

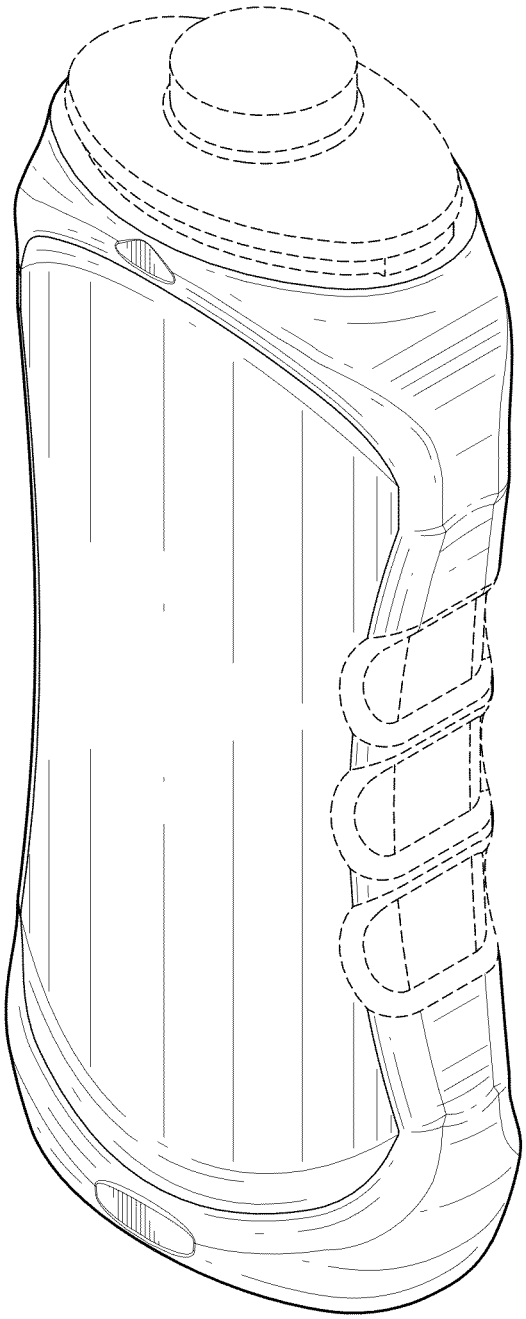
FIG. 8
Amended

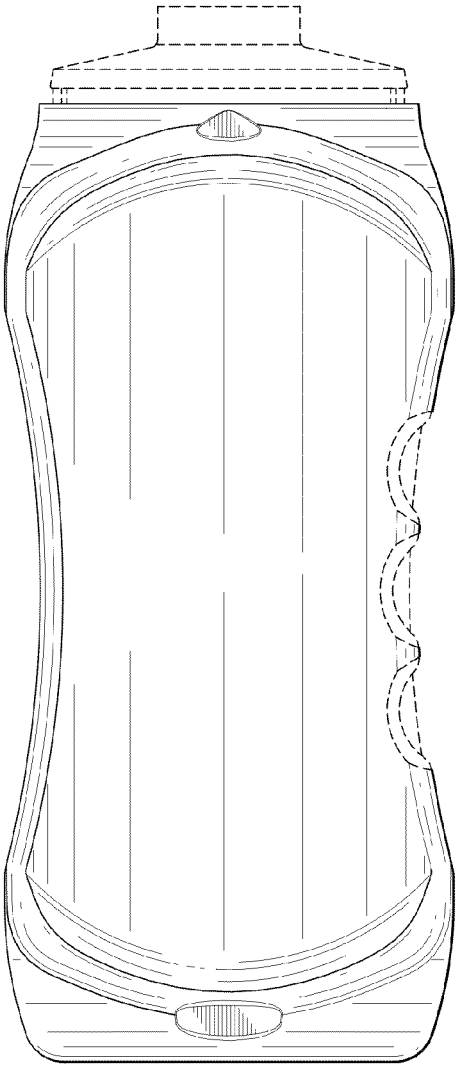
FIG.9
Amended
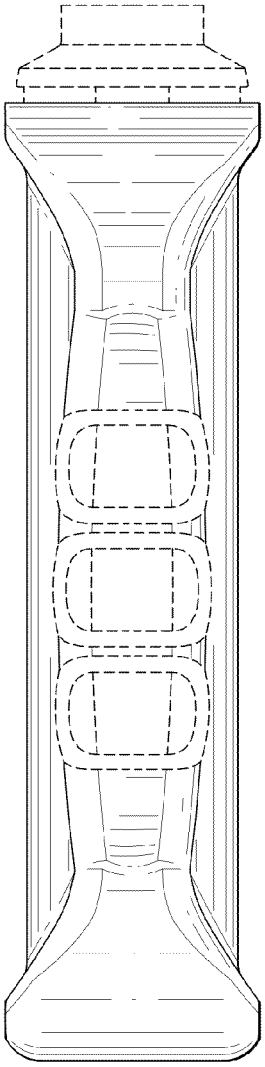
FIG.10
Amended

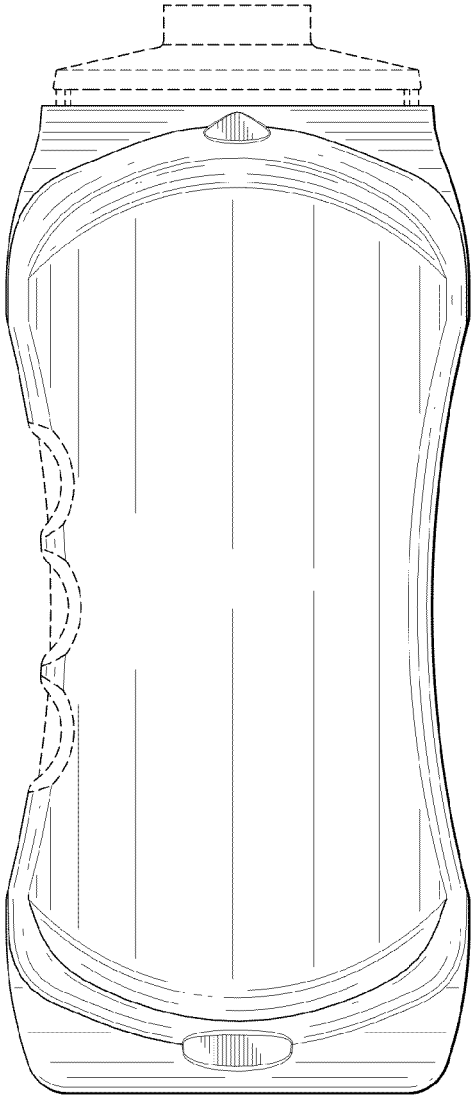
FIG. 12
Amended

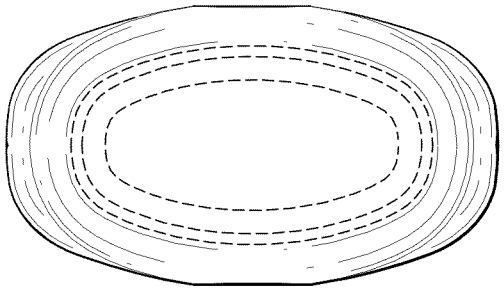
FIG. 14
Amended

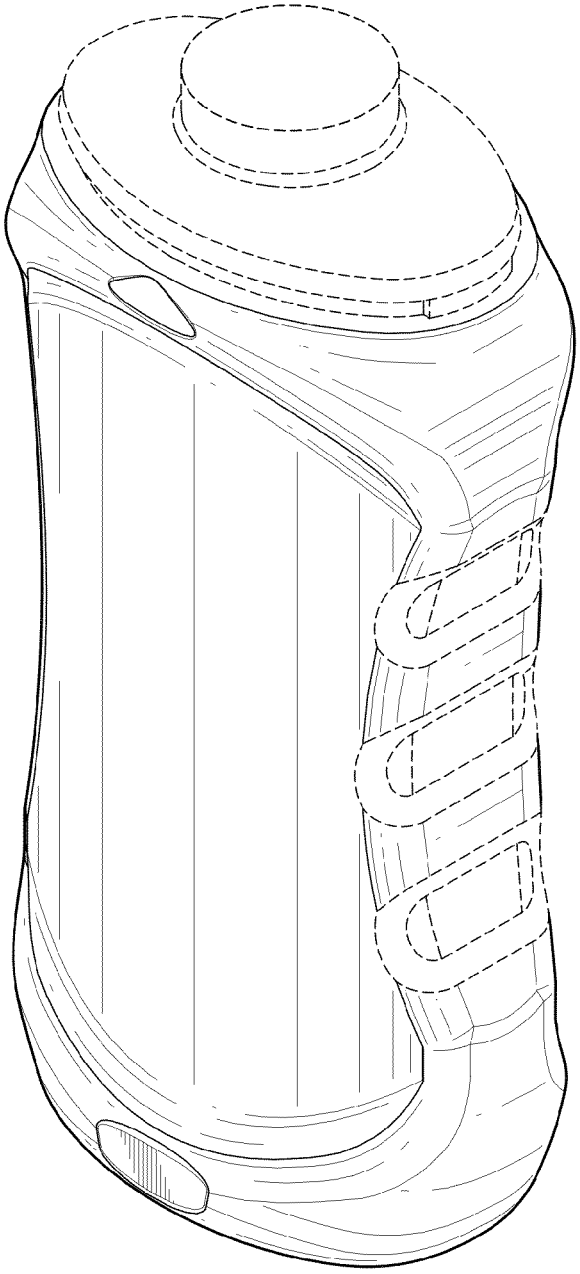
FIG. 15
Amended

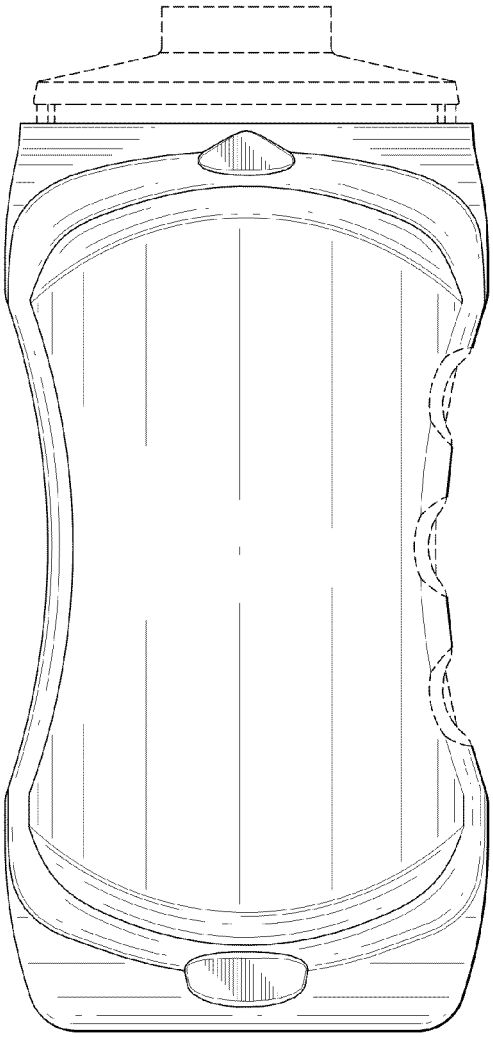
FIG. 16
Amended
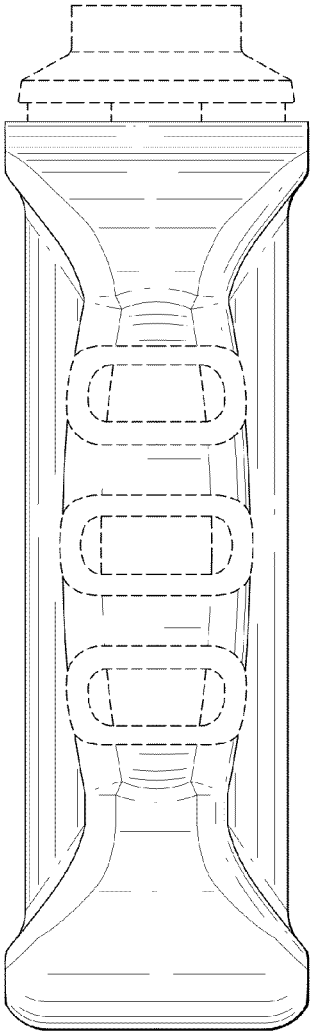
FIG. 17
Amended

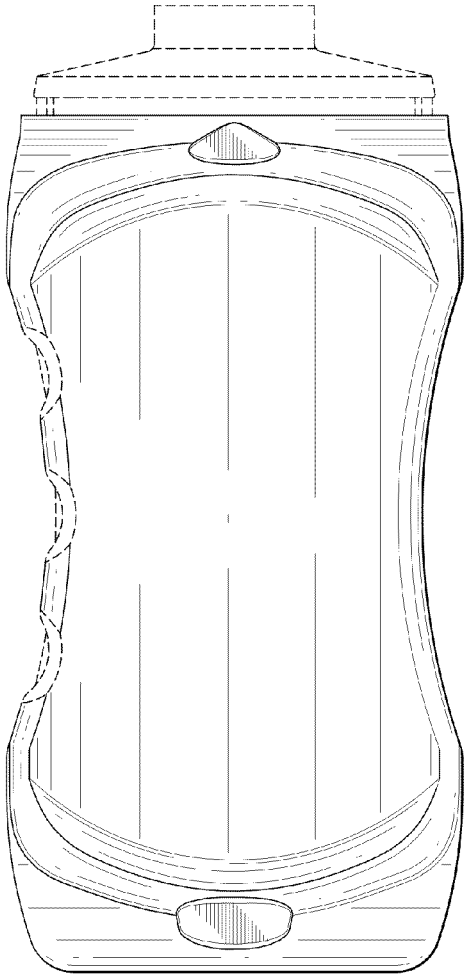
FIG.19
Amended

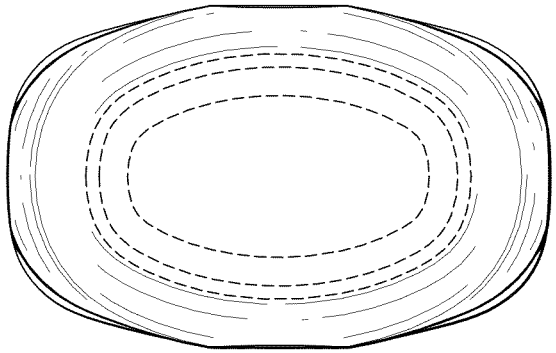
FIG.21
Amended